United States Patent
Liu et al.

(10) Patent No.: US 12,108,322 B2
(45) Date of Patent: Oct. 1, 2024

(54) METHOD FOR ENHANCING NETWORK COVERAGE BASED ON ADAPTIVE GENERATION OF RESOURCE CELL

(71) Applicant: Xidian University, Xi'an (CN)

(72) Inventors: Junyu Liu, Xi'an (CN); Min Sheng, Xi'an (CN); Ziwen Xie, Xi'an (CN); Jiandong Li, Xi'an (CN); Yu Su, Xi'an (CN); Yan Shi, Xi'an (CN); Xiayu Zhang, Xi'an (CN)

(73) Assignee: Xidian University, Xi'an (CN)

( * ) Notice: Subject to any disclaimer, the term of this patent is extended or adjusted under 35 U.S.C. 154(b) by 452 days.

(21) Appl. No.: 17/554,356

(22) Filed: Dec. 17, 2021

(65) Prior Publication Data

US 2022/0110045 A1 Apr. 7, 2022

(30) Foreign Application Priority Data

Aug. 26, 2021 (CN) .......................... 202110989309.8

(51) Int. Cl.
*H04W 40/24* (2009.01)
(52) U.S. Cl.
CPC ................................ *H04W 40/246* (2013.01)
(58) Field of Classification Search
CPC ............... H04W 40/246; H04W 16/18; H04W 24/02; H04W 88/00; H04W 88/085; H04W 16/26
See application file for complete search history.

(56) References Cited

U.S. PATENT DOCUMENTS

2022/0124543 A1* 4/2022 Orhan ................... G06N 3/006

FOREIGN PATENT DOCUMENTS

| CN | 106961686 A | 7/2017 |
| CN | 109996238 A | 7/2019 |

OTHER PUBLICATIONS

Alnoman et al., "Energy Efficiency on Fully Cloudified Mobile Networks: Survey, Challenges, and Open Issues", IEEE Communication Survey & Tutorials, vol. 20, No. 2, Second Quarter 2018 (Year: 2018).*

Mishra et al., "KORA: A Framework for Dynamic Consolidation & Relocation of Control Units in Virtualized 5G Ran", 2018 IEEE, Department of Computer Science and Engineering, Indian Institute of Technology Hyderabad, India (Year: 2018).*

Teng et al., Resource Allocation for Ultra-Dense Networks: A Survey, Some Research Issues and Challenges, IEEE Communications Surveys & Tutorials, vol. 21, No. 3, Third Quarter 2019 (Year: 2019).*

* cited by examiner

*Primary Examiner* — Justin T Van Roie (57) ABSTRACT

A method for enhancing network coverage based on adaptive generation of resource cell. A traditional cell in a network is taken as an initial state of the network. A correlation matrix in a current network state is generated. Whether $|\omega_{i,j}^{t} - \omega_{i,j}^{t-1}|/\omega_{i,j}^{t-1} > \varepsilon$ is determined. Each access point is divided into a plurality of resource cells. A CU-DU network mapping table is generated. A middlehaul link of each of the plurality of resource cells is constructed according to the CU-DU network mapping table.

6 Claims, 3 Drawing Sheets

METHOD FOR ENHANCING NETWORK COVERAGE BASED ON ADAPTIVE GENERATION OF RESOURCE CELL

CROSS-REFERENCE TO RELATED APPLICATIONS

This application claims the benefit of priority from Chinese Patent Application No. 202110989309.8, filed on Aug. 26, 2021. The content of the aforementioned application, including any intervening amendments thereto, is incorporated herein by reference in its entirety.

TECHNICAL FIELD

This application relates to communication technology, and more particularity to a method for enhancing network coverage based on adaptive generation of resource cell, which can help a network resource orchestrator to flexibly regulate a coverage structure according to user requirements, real-time network interference and coverage status monitoring information, so as to achieve the network coverage enhancement.

BACKGROUND

The development of wireless communication network has brought higher and higher requirements for network coverage. Recently, the network has been transformed from the homogeneous network composed of independently deployed traditional macrocell terrestrial base stations to the heterogeneous dense network composed of macrocell terrestrial base stations and femtocell terrestrial base stations, and finally to the three-dimensional dense network composed of aerial base stations. The network topology and the deployment density of access nodes are continuously optimized to enhance the network coverage as well as satisfy requirements of users for the network coverage. New networking modes and dense deployment of access nodes increase available resources, nevertheless, it also aggravates the resource usage conflict due to the lack of system-level resource management, which will further lead to a low resource utilization efficiency and a dramatic increase of interference to weaken the network capacity, failing to achieve the network coverage enhancement. The network coverage enhancement means that there are no coverage holes in wireless network signal coverage and capacity coverage in the three-dimensional space while maintaining continuous over time. With respect to the traffic mode using cell of origin, the coverage structure is composed of real physical cells (deployed in static), which leads to poor flexibility, failing to efficiently cope with the business change and transfer network resources. The above problems often cause a space-time discontinuity in the network signal coverage, and terminal access devices in local hot spots often suffer the capacity coverage problem such as "with signal but no traffic".

Chinese Patent Application No. 201610015699.8, titled "Method and apparatus for generating virtual cells across multiple adjacent macro cells and filed by Shanghai Nokia Bell Co., Ltd., proposed a network coverage enhancement method based on user-centric virtual cell coordinated multi-point (CoMP) technique, which includes the following steps: (S1) responding to an user equipment in a first macrocell and close to a boundary of the first macrocell, and sending a request information to one or multiple adjacent second macro base stations to request generation of a virtual cell across the first macro cell and the second macro cell; and (S2) responding to a received confirmation information for the request information to generate the virtual cell for the user equipment. Unfortunately, the user-centric virtual cell CoMP technique is lack of the system-level resource management between access nodes, which makes it difficult to effectively control the network interference at an excessive access node density.

Chinese patent application No. 201711477598.3, titled cloud-radio access network (C-RAN) network planning method and apparatus and filed by China Mobile Communications Group Co., Ltd., proposed a network coverage enhancement method based on cloud-radio access network (C-RAN) network planning, which is performed through steps of: (S1) obtaining an overlap coverage of each remote radio unit (RRU) with other RUUs in a RUU set; (S2) marking those RRUs with the overlap coverage higher than a preset coverage threshold, as adjacent RRUs; (S3) selecting a RRU from the RRU set as a primary RRU; (S4) forming a sub-cluster if a distance between the primary RRU and the adjacent RRU in the RRU set and a distance between any two adjacent RRUs meet a preset distance threshold; and (S5) removing the RRUs in the sub-cluster from the RRU set and selecting an RRU from the rest RRUs in the RRU set as the next primary RRU until the rest RRUs in the RRU set are not adjacent to other RRUs. The new 5G radio access network C-RAN can achieve the system-level management of resources, improve the frequency spectrum efficiency, reduce an interference and increase a capacity. Unfortunately, due to the fixed deployment of building base band unit (BBU) and RRU in the C-RAN structure of the fixed topological relationship, nodes in the C-RAN are difficult to expand, which makes it difficult for the C-RAN fails to make an adjustment according to requirements of the network coverage to achieve the network coverage enhancement.

SUMMARY

An object of the present disclosure is to provide a method for enhancing network coverage based on adaptive generation of resource cell to overcome the problems of the prior art that user-centric virtual cell CoMP technique fails to achieve the system-level resource management between access nodes, so that it is difficult to effectively control the network interference an excessive density of network access nodes; and the fixed deployment of BBUs and RRUs in the C-RAN and the fixed topological relation relationship make the C-RAN difficult to make adjustment according to requirements of the network coverage, failing to achieve the network coverage enhancement.

In the present disclosure, network access equipment of each user terminal in the wireless local area network is taken as an access point, and a correlation matrix of each access point in the current network state is generated. The resource cell to which each access point should subordinate is determined by a network resource choreographer utilizing the correlation matrix so as to cluster multiple access points. The clustered resource cell performs coordinated transmission to serve a terminal access device, solving the problem of the prior art that it is difficult to effectively control the network interference under an excessive network access point density due to the lack of system-level resource management and boundary effect. In the method of the present disclosure, a centralized unit (CU)-distributed unit (DU) mapping table is generated by using the resource choreographer according to the correlation matrix of each access point, and an activation of CU or DU function of each access point is determined and executed utilizing the CU-DU mapping table to build a middlehaul link between an access point executing the CU function in each resource cell and an access point executing DU function in the corresponding resource cell. When the network state changes, a correlation matrix is generated again by each access point according to the network state. The resource cell is redivided by the network resource orchestrator and a CU-DU mapping table in the current network state is generated, and the determination and execution of the activation of CU or DU function of each access point are performed again utilizing the current CU-DU mapping table to reconstruct the middlehaul link between the access point executing the CU function and the access point executing the DU function in each resource cell. Based on the above operations, the method of the present disclosure enables the adaptive adjustment of the network coverage structure according to the real-time network state, and overcomes the defect in the prior art that the network cannot be accordingly adjusted with change in the network coverage requirement due to the fixed deployment of the middlehaul link and fixed topological relationship in the C-RAN network structure.

Technical solutions of the disclosure are described as follows.

This application provides a method for enhancing network coverage based on adaptive generation of resource cell, comprising:

(S1) taking a traditional cell in a network as an initial state of the network;

(S2) generating a correlation matrix in a current network state, wherein the step (S2) is performed through steps of:

(S2a) monitoring a current network state of a plurality of access points in real time; and
performing step (S2b) if a network coverage or traffic changes;

(S2b) deploying, by a network resource orchestrator, an airborne access point according to a requirement to an area where a signal/capacity coverage hole occurs;

(S2c) quantifying a traffic correlation among the plurality of access points;
selecting two of the plurality of access points in the current network state, wherein when the two of the plurality of access points serve the same group of traffic in a local area, the traffic correlation is 1, otherwise the traffic correlation is 0; and
combining the traffic correlation between any two of the plurality of access points to form a traffic correlation matrix;

(S2d) allowing each of the plurality of access points to broadcast a latitude and longitude information thereof, and receive a latitude and longitude information of the rest of the plurality of access points;
calculating a distance between any two of the plurality of access points in the current network state; and
normalizing the distance to obtain a network topological matrix of the plurality of access points;

(S2e) allowing each of the plurality of access points to receive an interference sent from the rest of the plurality of access points; and
normalizing the interference to generate an interference matrix of the plurality of access points; and (S2f) subjecting the traffic correlation matrix, the network topological matrix and the interference matrix to linear weighting to generate a relevance matrix consisting of a relevance between the plurality of access points in the current network state;

(S3) determining whether $|\omega_{i,j}^{t}-\omega_{i,j}^{t-1}|/\omega_{i,j}^{t-1}>\varepsilon$, wherein if $|\omega_{i,j}^{t}-\omega_{i,j}^{t-1}|/\omega_{i,j}^{t-1}>\varepsilon$, sending the relevance matrix generated in the current network state to the network resource orchestrator followed by performing step (S4); otherwise proceeding to the step (S2);
wherein $|\cdot|$ is an operation of taking an absolute value; $\omega_{i,j}^{t}$ is a relevance between a ith access point and a jth access point in a relevance matrix at a current iteration; $\omega_{i,j}^{t-1}$ is a relevance between a ith access point and a jth access point in a correlation matrix at a previous iteration; and $\varepsilon$ is a preset trigger value;

(S4) dividing each of the plurality of access points into a plurality of resource cells, wherein the step (S4) is performed through steps of:

(S4a) selecting and deleting, by the network resource orchestrator, an access point with a minimum sequence number from an access point set formed by the plurality of access points;

(S4b) selecting access points with a relevance higher than a threshold from the rest access points in the access point set to form a resource cell; and
deleting the selected access points; and (S4c) determining whether the access point set is empty after treated by step (S4b), wherein if the access point set is empty, completing the division of the plurality of resource cells and then proceeding to step (S5); otherwise proceeding to step (S4a);

(S5) generating a CU-DU network mapping table, wherein the step (S5) is performed through steps of:

(S5a) calculating an average distance of a control link of each access point in each of the plurality of resource cells according to $$l_{k,v} = \sum_{m=1}^{n} d_{v,m}/n;$$

wherein $l_{k,v}$ is an average distance of a control link of a vth access point in a kth resource cell; $\Sigma$ is a summing operation; m is a sequence number of an access point; n is the number of access points in the kth resource cell; and $d_{v,m}$ is a distance between the vth access point and a mth access point;

(S5b) calculating a score value of each access point in each of the plurality of resource cells according to $p_{k,v}=S_{k,v}/l_{k,v}$, wherein $p_{k,v}$ is a score value of the vth access point in the kth resource cell; and $S_{k,v}$ is a throughput of the vth access point in the kth resource cell;

(S5c) sorting the score value of each access point in each of the plurality of resource cells from large to small;
selecting an access point with a largest score value in each of the plurality of resource cells as an access point for executing a CU function; and taking the remaining access points of each of the plurality of resource cells as access points for executing a DU function; and (S5d) generating a CU-DU network mapping table of a two-dimensional matrix; wherein in a row, if only an element on a leading diagonal is 1, the element on the leading diagonal indicates a traditional access point, and the traditional access point does not fall into the plurality of resource cells; if there are other elements being 1 besides an element on the leading diagonal, the element on the leading diagonal represents an access point that executes a CU function in a resource cell, and the other elements being 1 represent an access point that executes a DU function in a resource cell; and if an element on the leading diagonal is 0, the on the leading diagonal represents an access point that executing a DU function in other resource cells; and (S6) constructing a middlehaul link of each of the plurality of resource cells according to the CU-DU network mapping table, wherein the step (S6) is performed through steps of:

(S6a) delivering the CU-DU network mapping table to each of the plurality of access points;

(S6b) determining which one of the plurality of resource cells the plurality of access points respectively belongs to, and a function of each of the plurality of access points; wherein if an access point corresponds to a position of a diagonal of the CU-DU network mapping table where an element is 1, a CU function and a DU function of the access point and a backhaul function of the access point with respect to a core network are simultaneously activated; otherwise, the access point only activates a DU function, and an access point of an element being 1 on a diagonal of a row corresponding to a non-zero element on a column in the CU-DU network mapping table corresponding to the access point is registered to build a middlehaul link between CU and DU;

(S6c) adjusting, by an access point performing CU function in each of the plurality of resource cells, a deployment parameter of an airborne access point in of the same resource cell; wherein the airborne access point only activates the DU function; and (S6d) orchestrating, by the network resource orchestrator, an available resource for the plurality of resource cells to serve a terminal access device with resource cell as a unit.

Compared to the prior art, this application has the following beneficial effects.

(1) A correlation matrix of each access point in the current network state is generated, the resource cell to which each access point should subordinate is determined by a network resource choreographer utilizing the correlation matrix, and the resource cell is managed by system-level resource management, solving the problem of the prior art that it is difficult to effectively control the network interference under an excessive network access point density due to the lack of system-level resource management and boundary effect, such that, the resource cell managed by system-level resource management is taken as an unit to serve a terminal access device, reducing a network resource usage conflict, improving a network resource utilization efficiency and enhancing the network coverage.

(2) A CU-DU mapping table in the current network state is generated by the network resource orchestrator with changes of the network state, and the determination and execution of the activation of CU or DU function of each access point are performed again utilizing the current CU-DU mapping table to reconstruct the middlehaul link in each resource cell, so as to overcome the defect in the prior art that the network cannot be accordingly adjusted with change in the network coverage requirement due to the fixed deployment of the middlehaul link between the BBU and RRU and fixed topological relationship in the C-RAN network structure. Therefore, the present disclosure enables the adaptive adjustment of the network coverage structure according to the real-time network state, transfer network resources to efficiently cope, a network signal coverage to be continuous and a network capacity coverage to be hole-free.

DETAILED DESCRIPTION OF EMBODIMENTS

The present disclosure will be described below in detail with reference to the embodiments and accompanying drawings.

Figure 1:
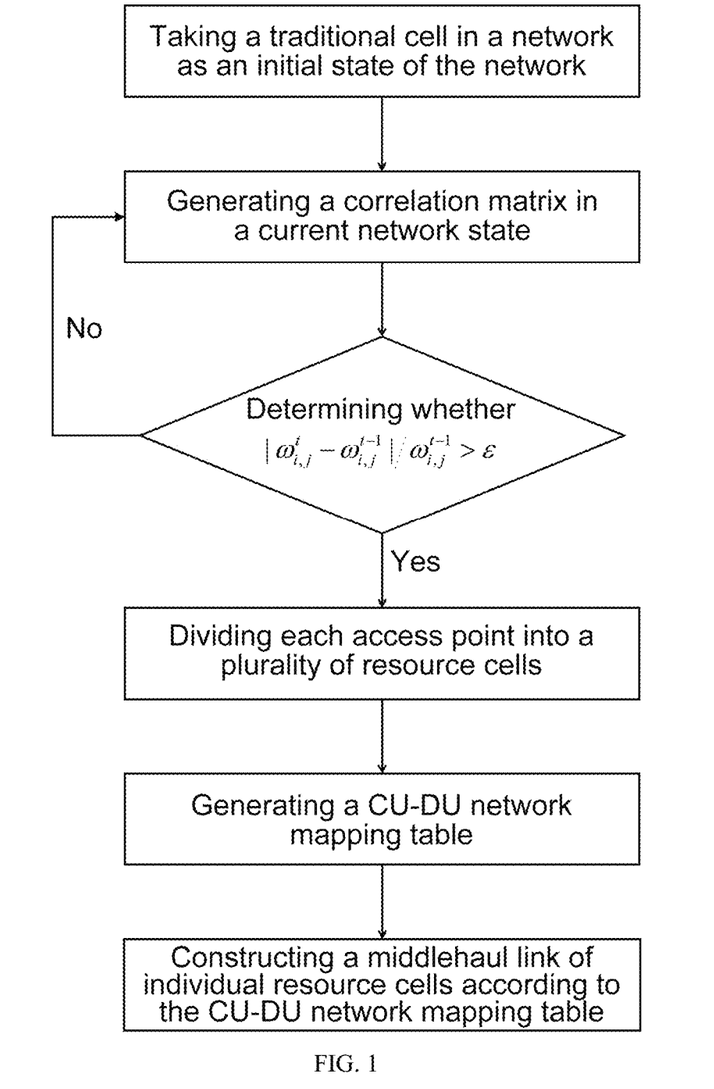
FIG. 1 is a flow chart of a method for enhancing network coverage based on adaptive generation of resource cell according to an embodiment of the present disclosure.

Referring to an embodiment shown in FIG. 1, a method for enhancing network coverage based on adaptive generation of resource cell is provided, which includes the following steps.

(S1) A traditional cell in a network is taken as an initial state of the network (S2) A correlation matrix in a current network state is generated, where the step (S2) is performed through the following steps.

A current network state of multiple access points is monitored in real time.

The current network state includes network coverage, traffic change, network topology and interference state.

An airborne access point is deployed to an area where a signal/capacity coverage hole occurs by a network resource orchestrator according to a requirement.

A traffic correlation among the access points is quantified. Two of the access points in the current network state are selected, where when the two of the access points serve the same group of traffic in a local area, the traffic correlation is 1, otherwise the traffic correlation is 0. The traffic correlation between any two of the access points is combined to form a traffic correlation matrix.

Each of the access points is allowed to broadcast a latitude and longitude information thereof, and receive a latitude and longitude information of the rest of the access points. A distance between any two of access points in the current network state is calculated and then normalized to obtain a network topological matrix of the access points.

Each of the access points is allowed to receive an interference sent from the rest of the access points. The interference is normalized to generate an interference matrix of the access points.

The traffic correlation matrix, the network topological matrix and the interference matrix are subjected to linear weighting to generate a relevance matrix consisting of a relevance between access points in the current network state.

(S3) Whether $|\omega_{i,j}^{t}-\omega_{i,j}^{t-1}|/\omega_{i,j}^{t-1}>\varepsilon$ is determined, where if $|\omega_{i,j}^{t}-\omega_{i,j}^{t-1}|/\omega_{i,j}^{t-1}>\varepsilon$, sending the relevance matrix generated in the current network state to the network resource orchestrator followed by performing step (S4), otherwise proceeding to the step (S2). |•| is an operation of taking an absolute value. $\omega_{i,j}^{t}$ is a relevance between a ith access point and a jth access point in a relevance matrix at a current iteration. $\omega_{i,j}^{t-1}$ is a relevance between a ith access point and a jth access point in a correlation matrix at a previous iteration. $\varepsilon$ is a preset trigger value.

The trigger value is set according to a congestion rate of a network control link.

(S4) Each of the access points is divided into multiple resource cells, where the step (S4) is specifically performed as follows.

An access point with a minimum sequence number is selected from an access point set formed by the access points and deleted by the network resource orchestrator.

Access points with a relevance higher than a threshold from the rest access points in the access point set are selected to form a resource cell, and the selected access points are deleted.

Whether the access point set is empty is determined after treated by the above step, where if the access point set is empty, completing the division of the resource cells and then proceeding to step (S5), otherwise performing the step (S4) again.

The threshold is a value in a range of [0,1] set according to the network state. If a hole occurs in a network signal coverage. A network capacity coverage is lower than a capacity requirement of a terminal access device. The interference becomes worse, the threshold is required to be set to a low value to make a coverage enhancing effect introduced by a system-level resource management tend to be saturated, where the system-level resource management is brought by extending a size of a single resource cell. Otherwise the threshold is required to be set to a high value to make a coverage enhancing effect introduced by a system-level resource management tend to be saturated, where the system-level resource management is brought by contracting a size of a single resource cell. When the network signal coverage hole occurs, the network capacity coverage is lower than a terminal access device, and the interference becomes worse, the threshold is required to be set to a low value to allow more access points to be divided into a same resource cell, that is, the size of the resource cell is larger and more access points are subject to system-level resource management. Otherwise, the threshold is required to be set to a high value.

(S5) A CU-DU network mapping table is generated, where the step (S5) is specifically performed as follows.

An average distance of a control link of each access point in each of the resource cells is calculated according to $$l_{k,v} = \sum_{m=1}^{n} d_{v,m}/n,$$

where $l_{k,v}$ is an average distance of a control link of a vth access point in a kth resource cell. $\Sigma$ is a summing operation. m is a sequence number of an access point. n is the number of the access points in the kth resource cell. $d_{v,m}$ is a distance between the vth access point and a mth access point.

A score value of each access point in each of the resource cells is calculated according to $p_{k,v}=S_{k,v}/l_{k,v}$, where $p_{k,v}$ is a score value of the vth access point in the kth resource cell. $S_{k,v}$ is a throughput of the vth access point in the k th resource cell.

The score value of each access point in each of the resource cells is sorted from large to small. An access point with a largest score value in each of the resource cells is selected as an access point for executing a CU function. The remaining access points of each of the resource cells are taken as access points for executing a DU function.

A CU-DU network mapping table of a two-dimensional matrix is generated, where in a row, if only an element on a leading diagonal is 1, the element on the leading diagonal indicates a traditional access point, and the traditional access point does not fall into resource cells. If there are other elements being 1 besides an element on the leading diagonal, the element on the leading diagonal represents an access point that executes a CU function in a resource cell, and the other elements being 1 represent an access point that executes a DU function in a resource cell. If an element on the leading diagonal is 0, the on the leading diagonal represents an access point that executing a DU function in other resource cells.

(S6) A middlehaul link of each of the resource cells is constructed according to the CU-DU network mapping table, where the step (S6) is specifically performed as follows.

The CU-DU network mapping table is delivered to each of the access points.

Which one of the resource cells the access points respectively belongs to, and a function of each of the access points are determined, where if an access point corresponds to a position of a diagonal of the CU-DU network mapping table where an element is 1, a CU function and a DU function of the access point and a backhaul function of the access point with respect to a core network are simultaneously activated; otherwise, the access point only activates a DU function, and an access point of an element being 1 on a diagonal of a row corresponding to a non-zero element on a column in the CU-DU network mapping table corresponding to the access point is registered to build a middlehaul link between CU and DU.

A deployment parameter of an airborne access point in of the same resource cell is adjusted by an access point performing CU function in each of the resource cells, where the airborne access point only activates the DU function.

An available resource for the resource cells is orchestrated by the network resource orchestrator to serve a terminal access device with resource cell as a unit.

The deployment parameter includes a location of the airborne access point, a motion mode of the airborne access point and a beam parameter of the airborne access point.

A deployment parameter of an airborne access point in of the same resource cell is adjusted by an access point performing CU function in each of the resource cells, where the airborne access point only activates the DU function, performing through the following steps.

An objective function of a resource cell to be adjusted is built, expressed as $$f = \frac{C_i}{A_i + \varepsilon},$$

where $\gamma$ is a utility factor with a value from 0 to 1, representing a proportion of optimization of the objective function. $C_i$ is a network capacity of a ith resource cell in a resource cell set to be adjusted, and $$C_i = \sum_{j=1}^{M_i} B \cdot \log_2(1 + SINR_{i,j}),$$

where B is a bandwidth of data transmission. $M_i$ is the number of transmission links served by the ith resource cell. $\log_2$ is a logarithm with base 2. $SINR_{i,j}$ is a signal to interference plus noise ratio of a jth transmission link of the ith resource cell.

$$A_i = \frac{\sum_{j=1}^{M_i}(B \cdot \log_2(1 + SINR_{i,j}))^2}{M_i} - \left(\frac{\sum_{j=1}^{M_i} B \cdot \log_2(1 + SINR_{i,j})}{M_i}\right)^2,$$

and represents a variance of a transmission rate of all transmission links of the ith resource cell. ε is a small number to prevent a denominator of the objective function from being 0.

A deployment parameter of an airborne DU for the resource cell to be adjusted is obtained under constraints of flight height, transmit power and energy of the airborne DU.

The technical solutions of the present disclosure will be further described in the following two embodiments.

Embodiment 1 illustrates an adaptive generation of resource cell of a terrestrial network. Embodiment 2 illustrates an adaptive generation of the resource cells of a three-dimensional dense network.

Figure 2A:
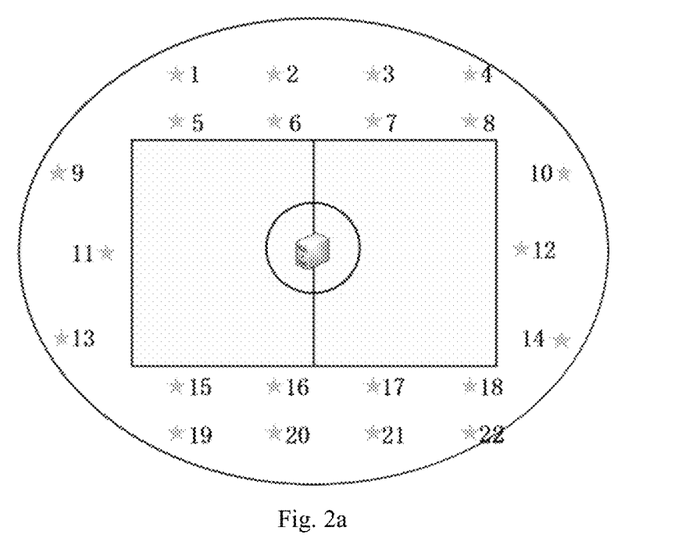
FIGS. 2a-d are simulation diagrams of 5G access points and the network resource orchestrator.

Embodiment 1 illustrates a process of enabling adaptive generation of resource cell of a terrestrial network on a stadium with 15.18 square kilometers. As shown in FIG. 2*a*, 22 access points, all of which are 5G access point, are deployed. An area enclosed by an oval line is an area where the access points deployed, where an area therein enclosed by a rectangular line in center is an area where the network resource orchestrator deployed, and the network resource orchestrator is arranged at center.

Two rows of the access points are evenly arranged above the area deployed the network resource orchestrator, including a first row and a second row. The first row is evenly arranged four access points numbered 1-4. The second row is evenly arranged four access points numbered 5-8. The access points of the first row and that of the second row in a corresponding location are aligned one by one. Two rows of the access points are evenly arranged below the area deployed the network resource orchestrator, including a third row and a fourth row. The third row is evenly arranged four access points numbered 15-18. The fourth row is evenly arranged four access points numbered 19-22. The access points of the third row and that of the fourth row in a corresponding location are aligned one by one. Three access points, numbered 9, 11 and 13, are evenly arranged at a left of the area deployed the network resource orchestrator. Three access points, numbered 10, 12 and 14, are evenly arranged at a right of the area deployed the network resource orchestrator. The access points have both CU function and DU function, which is activated according to requirements. The network resource orchestrator is configured to control the access points and orchestrate resources. The access points work in a frequency band of 2.6 GHz and a transmit power of 23 dBm.

In an initial network state, each of the access points serves a terminal access device as independent traditional cell, respectively.

An average link density of the 22 access points and a downlink traffic of the 22 access points in a current network state are detected in real-time. In this embodiment, when the average link density changes, a correlation matrix of the 22 access points in the current network state is generated, where each element therein represents a correlation between an access point and other access points currently, expressed as follows:

|       | $AP_1$ | $AP_2$ | $AP_3$ | $AP_4$ | $AP_5$ | $AP_6$ | $AP_7$ | ... | $AP_{22}$ |
|-------|--------|--------|--------|--------|--------|--------|--------|-----|-----------|
| $AP_1$ [ | 1 | 0.89 | 0.29 | 0.19 | 0.95 | 0.88 | 0.28 | ... | 0 ] |

|       | $AP_1$ | $AP_2$ | $AP_3$ | $AP_4$ | $AP_5$ | $AP_6$ | $AP_7$ | ... | $AP_{22}$ |
|-------|--------|--------|--------|--------|--------|--------|--------|-----|-----------|
| $AP_2$ [ | 0.88 | 1 | 0.38 | 0.26 | 0.86 | 0.94 | 0.36 | ... | 0 ] |

⋮

|       | $AP_1$ | $AP_2$ | $AP_3$ | $AP_4$ | $AP_5$ | $AP_6$ | $AP_7$ | ... | $AP_{22}$ |
|-------|--------|--------|--------|--------|--------|--------|--------|-----|-----------|
| $AP_5$ [ | 0.94 | 0.87 | 0.27 | 0.17 | 1 | 0.89 | 0.28 | ... | 0.02 ] |

|       | $AP_1$ | $AP_2$ | $AP_3$ | $AP_4$ | $AP_5$ | $AP_6$ | $AP_7$ | ... | $AP_{22}$ |
|-------|--------|--------|--------|--------|--------|--------|--------|-----|-----------|
| $AP_6$ [ | 0.85 | 0.93 | 0.35 | 0.22 | 0.86 | 1 | 0.36 | ... | 0 ] |

⋮

|       | $AP_1$ | $AP_2$ | $AP_3$ | $AP_4$ | $AP_5$ | $AP_6$ | $AP_7$ | ... | $AP_{22}$ |
|-------|--------|--------|--------|--------|--------|--------|--------|-----|-----------|
| $AP_{22}$ [ | 0.03 | 0.08 | 0.13 | 0.06 | 0.12 | 0.16 | 0.18 | ... | 1 ]. |

Access points with a correlation greater than 0.8 in the correlation matrix are divided into a same resource cell. Such that access point 1, access point 2, access point 5 and access point 6 are divided into the same resource cell, and the rest of 18 access points are not divided into any resource cell, and are configured to serve a terminal access device as a CU independently.

A CU-DU mapping table is generated by the network resource orchestrator utilizing the correlation matrix in the current network state. Meanwhile, the CU-DU mapping table generated by the network resource orchestrator is delivered to each of the access points. The CU-DU mapping table is expressed as follows:

$$\begin{bmatrix} 1 & 0 & 0 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 & 0 \\ 0 & 0 & 1 & 1 & 0 & 0 & 1 & 1 & 0 & 0 & 0 & 0 & 0 & 0 & 0 & 0 & 1 \\ 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 0 & 0 & 0 & 0 & 0 & 0 \end{bmatrix}.$$

Figure 2B:
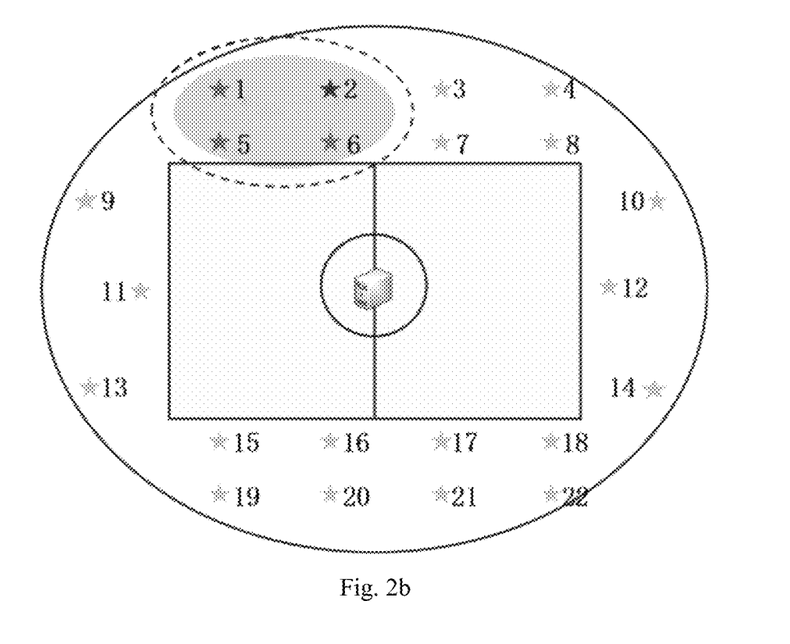

As shown in FIG. 2b, which one of the resource cells the access points respectively belongs to, and a function of each of the access points are determined. A CU function and a DU function of the access point and a backhaul function of the access point with respect to a core network are activated. The access point is registered to CU to build a middlehaul link between CU and DU. In FIG. 2b, access point 1, access point 2, access point 5, and access point 6 are divided into the same resource cell, where access point 2 is the CU of the resource cell, access point 1, access point 5, and access point 6 are the DU of the resource cell, and the rest of the access points serve a terminal access device with resource cell as a unit.

Figure 2C:
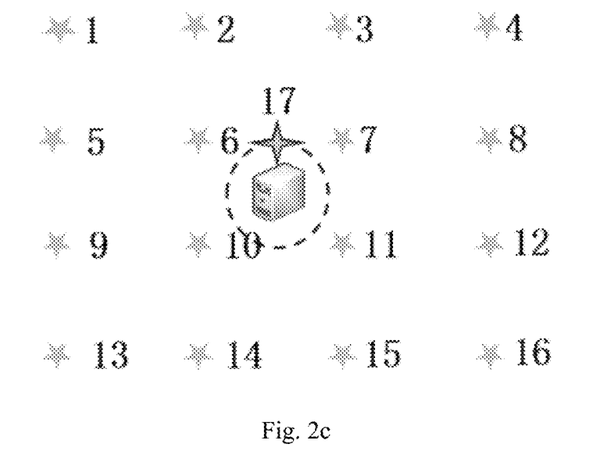

Embodiment 2 illustrates a process of enabling adaptive generation of the resource cells of a three-dimensional dense network on an outdoor square. As shown in FIG. 2c, 17 access points, all of which are 5G access point, are deployed, including 16 terrestrial access points and an airborne access point. A network resource orchestrator is arranged at center of the FIG. 2c. The 16 terrestrial access points are arranged evenly in four rows and surround the network resource orchestrator, including a first row, a second row, a third row and a fourth row. The first row is evenly arranged four terrestrial access points numbered 1-4. The second row is evenly arranged four terrestrial access points numbered 5-8. The third row is evenly arranged four terrestrial access points numbered 9-12. The fourth row is evenly arranged four terrestrial access points numbered 13-16. The terrestrial access points of the four rows in a corresponding location are aligned one by one. A dotted line therein is a motion trial of the airborne access point numbered 17. All the access points have both CU function and DU function, which is activated according to requirements. The network resource orchestrator is configured to control the access points and orchestrate resources. The access points work in a frequency band of 2.6 GHz. An operating power of the terrestrial access points is 23 dBm. An operating power of the airborne access point is 30 dBm, a circling radius thereof is 20 m-50 m, and a flight height is 100 m-300 m.

In an initial network state, each of the access points serves a terminal access device as an independent traditional cell, respectively.

An average link density of the 17 access points and a downlink traffic of the 17 access points in a current network state are detected in real-time. In this embodiment, when the average link density changes, the airborne access point is deployed to an area where a coverage hole occurs by the network resource orchestrator, and a correlation matrix of the 17 access points in the current network state is generated, where each element therein is a correlation between an access point and other access points currently, expressed as follows:

$$\begin{array}{c} \\ AP_3 \end{array} \begin{bmatrix} AP_1 & AP_2 & AP_3 & AP_4 & \vdots \\ AP_5 & AP_6 & AP_7 & AP_8 & \dots & AP_{17} \\ 0.17 & 0.34 & 1 & 0.84 & 0.14 & 0.29 & 0.84 & 0.79 & \dots & 0.91 \end{bmatrix}$$

$$AP_4 \begin{bmatrix} AP_1 & AP_2 & AP_3 & AP_4 & AP_5 & AP_6 & AP_7 & AP_8 & \dots & AP_{17} \\ 0.10 & 0.24 & 0.87 & 1 & 0.99 & 0.21 & 0.83 & 0.87 & \dots & 0.93 \end{bmatrix}$$

$$\vdots$$

$$AP_7 \begin{bmatrix} AP_1 & AP_2 & AP_3 & AP_4 & AP_5 & AP_6 & AP_7 & AP_8 & \dots & AP_{17} \\ 0.07 & 0.24 & 0.80 & 0.74 & 0.10 & 0.30 & 1 & 0.80 & \dots & 0.81 \end{bmatrix}$$

$$AP_8 \begin{bmatrix} AP_1 & AP_2 & AP_3 & AP_4 & AP_5 & AP_6 & AP_7 & AP_8 & \dots & AP_{17} \\ 0.04 & 0.18 & 0.81 & 0.85 & 0.06 & 0.20 & 0.85 & 1 & \dots & 0.86 \end{bmatrix}$$

$$\vdots$$

$$AP_{17} \begin{bmatrix} AP_1 & AP_2 & AP_3 & AP_4 & AP_5 & AP_6 & AP_7 & AP_8 & \dots & AP_{17} \\ 0.13 & 0.27 & 0.91 & 0.92 & 0.11 & 0.25 & 0.86 & 0.86 & \dots & 1 \end{bmatrix}.$$

Access points with a correlation greater than 0.8 in the correlation matrix are divided into a same resource cell. Such that access point 3, access point 4, access point 7, access point 8 and access point 17 are divided into the same resource cell, and the rest of 12 access points are not divided into any resource cell, and are configured to serve a terminal access device as a CU independently.

A CU-DU mapping table is generated by the network resource orchestrator utilizing the correlation matrix in the current network state. Meanwhile, the CU-DU mapping table is delivered to each of the access points. The CU-DU mapping table is expressed as follows:

$$\begin{bmatrix} 0 & 0 & 0 & 0 & 0 & 0 & 0 & 0 & 0 & 0 & 0 & 0 & 0 & 0 & 0 & 0 & 0 & 0 & 0 & 0 & 0 \\ 1 & 1 & 0 & 0 & 1 & 1 & 0 & 0 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 0 & 0 & 0 & 0 & 0 & 1 & 0 & 0 & 0 & 0 & 0 & 0 & 0 & 0 & 0 \\ 0 & 0 & 0 & 0 & 0 & 0 & 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 0 & 0 & 0 & 0 & 0 & 0 & 0 & 0 & 0 & 1 \end{bmatrix}.$$

Figure 2D:
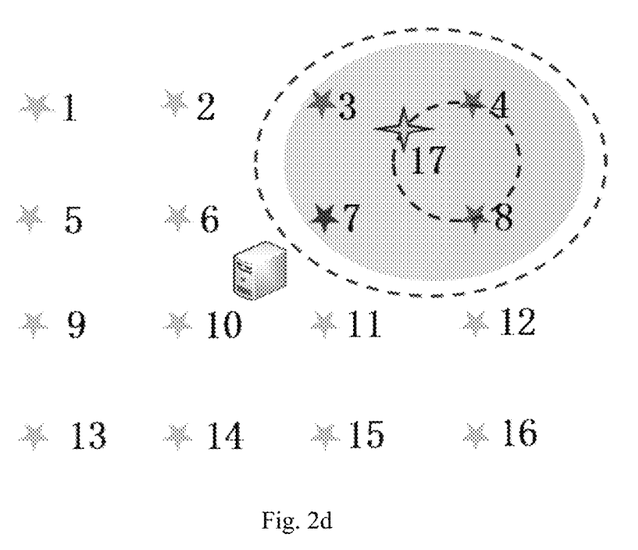

As shown in FIG. 2d, which one of the resource cells the access points respectively belongs to, and a function of each of the access points are determined. A CU function and a DU function of the access point and a backhaul function of the access point with respect to a core network are activated. The access point is registered to CU to build a middlehaul link between CU and DU. In FIG. 2d, access point 3, access point 4, access point 7, access point 8, and access point 17 are divided into the same resource cell, where access point 7 is the CU of the resource cell, access point 3, access point 4, access point 8, and access point 17 are the DU of the resource cell, and the rest of the access points serve a terminal access device with resource cell as a unit.

What is claimed is:

1. A method for enhancing network coverage based on adaptive generation of resource cell, comprising:
   (S1) taking a traditional cell in a network as an initial state of the network;
   (S2) generating a correlation matrix in a current network state, wherein the step (S2) is performed through steps of:
   (S2a) monitoring a current network state of a plurality of access points in real time; and
   performing step (S2b) if a network coverage or traffic changes;
   (S2b) deploying, by a network resource orchestrator, an airborne access point according to a requirement to an area where a signal/capacity coverage hole occurs;
   (S2c) quantifying a traffic correlation among the plurality of access points;
   selecting two of the plurality of access points in the current network state, wherein when the two of the plurality of access points serve the same group of traffic in a local area, the traffic correlation is 1, otherwise the traffic correlation is 0; and
   combining the traffic correlation between any two of the plurality of access points to form a traffic correlation matrix;
   (S2d) allowing each of the plurality of access points to broadcast a latitude and longitude information thereof, and receive a latitude and longitude information of the rest of the plurality of access points;
   calculating a distance between any two of the plurality of access points in the current network state; and
   normalizing the distance to obtain a network topological matrix of the plurality of access points;
   (S2e) allowing each of the plurality of access points to receive an interference sent from the rest of the plurality of access points; and
   normalizing the interference to generate an interference matrix of the plurality of access points; and
   (S2f) subjecting the traffic correlation matrix, the network topological matrix and the interference matrix to linear weighting to generate a relevance matrix consisting of a relevance between the plurality of access points in the current network state;
   (S3) determining whether $|\omega_{i,j}^{t}-\omega_{i,j}^{t-1}|/\omega_{i,j}^{t-1}>\varepsilon$, wherein if $|\omega_{i,j}^{t}-\omega_{i,j}^{t-1}|/\omega_{i,j}^{t-1}>\varepsilon$, sending the relevance matrix generated in the current network state to the network resource orchestrator followed by performing step (S4); otherwise proceeding to the step (S2);
   wherein $|\cdot|$ is an operation of taking an absolute value; $\omega_{i,j}^{t}$ is a relevance between a ith access point and a jth access point in a relevance matrix at a current iteration; $\omega_{i,j}^{t-1}$ is a relevance between a ith access point and a jth access point in a correlation matrix at a previous iteration; and $\varepsilon$ is a preset trigger value;
   (S4) dividing each of the plurality of access points into a plurality of resource cells, wherein the step (S4) is performed through steps of:
   (S4a) selecting and deleting, by the network resource orchestrator, an access point with a minimum sequence number from an access point set formed by the plurality of access points;
   (S4b) selecting access points with a relevance higher than a threshold from the rest access points in the access point set to form a resource cell; and
   deleting the selected access points; and
   (S4c) determining whether the access point set is empty after treated by step (S4b), wherein if the access point set is empty, completing the division of the plurality of resource cells and then proceeding to step (S5); otherwise proceeding to step (S4a);
   (S5) generating a CU-DU network mapping table, wherein the step (S5) is performed through steps of:
   (S5a) calculating an average distance of a control link of each access point in each of the plurality of resource cells according to $$l_{k,v} = \sum_{m=1}^{n} d_{v,m}/n;$$

wherein $l_{k,v}$ is an average distance of a control link of a vth access point in a kth resource cell; $\Sigma$ is a summing operation; m is a sequence number of an access point; n is the number of access points in the kth resource cell; and $d_{v,m}$ is a distance between the vth access point and a mth access point;
   (S5b) calculating a score value of each access point in each of the plurality of resource cells according to $p_{k,v}=S_{k,v}/l_{k,v}$, wherein $p_{k,v}$ is a score value of the vth access point in the kth resource cell; and $S_{k,v}$ is a throughput of the vth access point in the kth resource cell;

(S5c) sorting the score value of each access point in each of the plurality of resource cells from large to small;
selecting an access point with a largest score value in each of the plurality of resource cells as an access point for executing a CU function; and
taking the remaining access points of each of the plurality of resource cells as access points for executing a DU function; and
(S5d) generating a CU-DU network mapping table of a two-dimensional matrix; wherein in a row, if only an element on a leading diagonal is 1, the element on the leading diagonal indicates a traditional access point, and the traditional access point does not fall into the plurality of resource cells; if there are other elements being 1 besides an element on the leading diagonal, the element on the leading diagonal represents an access point that executes a CU function in a resource cell, and the other elements being 1 represent an access point that executes a DU function in a resource cell; and if an element on the leading diagonal is 0, the on the leading diagonal represents an access point that executing a DU function in other resource cells; and
(S6) constructing a middlehaul link of each of the plurality of resource cells according to the CU-DU network mapping table, wherein the step (S6) is performed through steps of:
(S6a) delivering the CU-DU network mapping table to each of the plurality of access points;
(S6b) determining which one of the plurality of resource cells the plurality of access points respectively belongs to, and a function of each of the plurality of access points; wherein if an access point corresponds to a position of a diagonal of the CU-DU network mapping table where an element is 1, a CU function and a DU function of the access point and a backhaul function of the access point with respect to a core network are simultaneously activated; otherwise, the access point only activates a DU function, and an access point of an element being 1 on a diagonal of a row is registered to build a middlehaul link between CU and DU, wherein the row corresponds to a non-zero element on a column in the CU-DU network mapping table corresponding to the access point;
(S6c) adjusting, by an access point performing CU function in each of the plurality of resource cells, a deployment parameter of an airborne access point in of the same resource cell; wherein the airborne access point only activates the DU function; and
(S6d) orchestrating, by the network resource orchestrator, an available resource for the plurality of resource cells to serve a terminal access device with resource cell as a unit.

2. The method of claim 1, wherein in step (S2a), the current network state comprises network coverage, traffic change, network topology and interference state.

3. The method of claim 1, wherein in step (S3), the trigger value is set according to a congestion rate of a network control link.

4. The method of claim 1, wherein in step (S4b), the threshold is a value in a range of [0,1] set according to the network state; if a hole occurs in a network signal coverage; a network capacity coverage is lower than a capacity requirement of a terminal access device; and the interference becomes worse, the threshold is required to be set to [0,0.5] to make a coverage enhancing effect introduced by a system-level resource management tend to be saturated, wherein the system-level resource management is brought by extending a size of a single resource cell; otherwise the threshold is required to be set to [0.5,1] to make a coverage enhancing effect introduced by a system-level resource management tend to be saturated, wherein the system-level resource management is brought by contracting a size of a single resource cell.

5. The method of claim 1, wherein the step (S6c) comprises:

building an objective function of a resource cell to be adjusted, expressed as $$f = \frac{C_i}{A_i + \varepsilon},$$

wherein $\gamma$ is a utility factor with a value from 0 to 1, representing a proportion of optimization of the objective function; $C_i$ is a network capacity of a ith resource cell in a resource cell set to be adjusted, and $$C_i = \sum_{j=1}^{M_i} B \cdot \log_2(1 + SINR_{i,j}),$$

wherein B is a bandwidth of data transmission; $M_i$ is the number of transmission links served by the ith resource cell; $\log_2$ is a logarithm with base 2; $SINR_{i,j}$ is a signal to interference plus noise ratio of a jth transmission link of the ith resource cell;

$$A_i = \frac{\sum_{j=1}^{M_i} (B \cdot \log_2(1 + SINR_{i,j}))^2}{M_i} - \left(\frac{\sum_{j=1}^{M} B \cdot \log_2(1 + SINR_{i,j})}{M_i}\right)^2,$$

and represents a variance of a transmission rate of all transmission links of the ith resource cell; and $\varepsilon$ is a small number to prevent a denominator of the objective function from being 0; and obtaining a deployment parameter of an airborne DU for the resource cell to be adjusted under constraints of flight height, transmit power and energy of the airborne DU.

6. The method of claim 1, wherein in step (S6c), the deployment parameter comprises a location of the airborne access point, a motion mode of the airborne access point and a beam parameter of the airborne access point.

* * * * *